United States Patent
Moroney et al.

(10) Patent No.: US 8,914,310 B2
(45) Date of Patent: Dec. 16, 2014

(54) MULTI-FUNCTIONAL CONTROL UNIT FOR AN IONIC FOOT BATH SYSTEM

(75) Inventors: Neill Edward Moroney, Aurora, CO (US); Brian Bell, Wheat Ridge, CO (US)

(73) Assignee: A Major Difference, Inc., Aurora, CO (US)

( * ) Notice: Subject to any disclaimer, the term of this patent is extended or adjusted under 35 U.S.C. 154(b) by 718 days.

(21) Appl. No.: 12/693,957

(22) Filed: Jan. 26, 2010

(65) Prior Publication Data

US 2010/0191654 A1 Jul. 29, 2010

Related U.S. Application Data

(60) Provisional application No. 61/148,333, filed on Jan. 29, 2009.

(51) Int. Cl.
| | |
|---|---|
| G06Q 99/00 | (2006.01) |
| G07F 17/18 | (2006.01) |
| A47K 3/022 | (2006.01) |
| G06Q 20/40 | (2012.01) |
| H04L 9/08 | (2006.01) |
| H04L 9/32 | (2006.01) |
| G06Q 20/38 | (2012.01) |

(52) U.S. Cl.
CPC ............ *G07F 17/18* (2013.01); *G06Q 2220/10* (2013.01); *G06Q 20/3821* (2013.01); *A47K 3/022* (2013.01); *G06Q 20/401* (2013.01); *H04L 9/083* (2013.01); *H04L 9/0866* (2013.01); *H04L 9/321* (2013.01); *H04L 9/3234* (2013.01); *H04L 2209/56* (2013.01)
USPC .................. 705/75; 705/50; 705/64; 705/76; 705/77

(58) Field of Classification Search
USPC .......................................... 705/50, 64, 75–77
See application file for complete search history.

(56) References Cited

U.S. PATENT DOCUMENTS

| | | | | |
|---|---|---|---|---|
| 4,295,039 | A * | 10/1981 | Stuckert ........................ | 235/380 |
| 5,892,900 | A * | 4/1999 | Ginter et al. .................... | 726/26 |
| 6,169,976 | B1 * | 1/2001 | Colosso ......................... | 705/59 |
| 7,160,434 | B2 * | 1/2007 | Becker et al. ................. | 205/742 |
| 2002/0010684 | A1 * | 1/2002 | Moskowitz ..................... | 705/75 |
| 2003/0105721 | A1 * | 6/2003 | Ginter et al. .................... | 705/54 |
| 2003/0216794 | A1 * | 11/2003 | Becker et al. .................. | 607/85 |
| 2004/0103290 | A1 * | 5/2004 | Mankins ........................ | 713/193 |

(Continued)

OTHER PUBLICATIONS

PCT Application No. PCT/US2010/022232, International Search Report and Written Opinion dated Apr. 1, 2010, 9 pages.

*Primary Examiner* — James D Nigh
(74) *Attorney, Agent, or Firm* — Dorsey & Whitney LLP

(57) ABSTRACT

One particular implementation of the present invention may involve a control unit of an ionic foot bath or other health product. The control unit may be connected to a network or the Internet such that the control unit may be monitored or controlled by a third party, such that the third party may provide programming updates, adjust the programming of the control unit to conform to the user's preferences and provide flexibility to a practitioner with several foot bath systems. The control unit may also provide the functionality of a pay-per-use method for use of the ionic foot bath. The method may allow a user or an operator of the product to purchase operational time that is desired to use the product. Once the operating time is purchased, the product may be operated for the purchased amount of time, at which point, more usage time may be purchased.

25 Claims, 10 Drawing Sheets

(56) References Cited

U.S. PATENT DOCUMENTS

| | | | |
|---|---|---|---|
| 2004/0138708 A1* | 7/2004 | Tucek ............................... | 607/2 |
| 2005/0198376 A1* | 9/2005 | Kotzin .......................... | 709/238 |
| 2006/0153370 A1* | 7/2006 | Beeson .......................... | 380/30 |
| 2006/0179002 A1* | 8/2006 | Brooks et al. ................... | 705/59 |

* cited by examiner

MULTI-FUNCTIONAL CONTROL UNIT FOR AN IONIC FOOT BATH SYSTEM

CROSS-REFERENCE TO RELATED APPLICATION

The present application claims the benefit under 35 U.S.C. §119(e) to U.S. Provisional Patent Application No. 61/148,333 (the '333 application"), which was filed on Jan. 29, 2009, and entitled "Multi-Functional Control Unit For an Ionic Foot Bath System". The '333 application is incorporated by reference into the present application in its entirety.

FIELD OF THE INVENTION

Aspects of the present invention relate to wellness and therapeutic devices, more particularly to a multi-functional control unit for a wellness or therapeutic device configured to reduce tissue acids using ionized water (such as in an ionic foot bath).

BACKGROUND

Electrolysis involves ionizing water by passing an electrical current through water. When water is ionized, the individual water molecules are split into their constituent elements, namely hydrogen ions (H+) and hydroxy ions (OH−).

By creating a preponderance of either negative ions or positive ions in water, desirable effects may be realized. For example, it is believed that charged particles may be drawn from the body by placing a body part, such as the feet, in a water bath having a preponderance of negative ions or of positive ions. For example, metal cations may be attracted to alkaline water, or water in which a preponderance of negative ions has been produced, and may pass through the skin of a user and into the ionized water. One such ionic foot bath is described in U.S. Pat. No. 7,160,434, the entirety of which is incorporated by reference herein.

Generally, such therapeutic ionic foot baths may be purchased for use by single user or by a practitioner. When purchased by a single user, the purchaser may purchase the ionic bath device for home use as desired by the user. Alternatively, a practitioner purchaser may set up one or more ionic foot bath systems in a central location, such as a doctor's office, and rent the use of the foot bath to patients that may benefit from the use of the foot bath. For example, the practitioner may sell the use of the foot bath in 30 minute increments to his/her patients as part of an overall wellness and health plan.

Once the ionic foot bath has been sold to the user or practitioner, however, it may be difficult for a third party, such as the foot bath seller or manufacturer, to provide proper maintenance or updates to the foot bath system. For example, routine maintenance of the foot bath system may be required to keep the system operating smoothly. To provide such maintenance, the user may be required to ship the foot bath system to a third party who performs the proper maintenance on the system. However, the shipment of the system to the third party for maintenance may be both costly and inconvenient for the purchaser. Similarly, the foot bath system may include several therapeutic sessions pre-loaded on the system for selection by the user when sold. Any upgrade to alter or include more therapeutic sessions may require the user to return the system to the seller. This may also be a great expense and inconvenience for the user. Thus, what is needed is an ionic foot bath system that includes a control unit that may communicate with a third party. Through the control unit, the ionic foot bath may be monitored or updated remotely from a third party, without the need of shipping the system to the third party.

Further, the purchase of an entire ionic foot bath system may be costly to some practitioner purchasers. Thus, several sessions with the bath may have to be sold to patients before the purchaser begins to see a return on the investment of the purchase of the foot bath system. Thus, what is also needed is a ionic bath system that allows a user to lease the ionic foot bath system and purchase allotments of operational time of the bath as needed. This would allow the practitioner purchaser to provide the wellness and therapeutic benefits of the foot bath system to his/her patients without having to purchase the entire system, thereby reducing the overall costs of the system to the practitioner.

SUMMARY

One implementation may take the shape of a control unit for an ionic foot bath system. The control unit may include an input device configured to receive an indication of a user-selectable feature to be operated by the ionic foot bath system, a display device configured to display information to a user of the control unit, a processor coupled to the input device and display device and a storage device coupled to the processor. The storage device may be configured to store a computer-executable code such that, when executed by the processor, causes the control unit to perform operations. The operations may include generating a first key of a public/private encryption key pair in response to the indication of the user-selectable feature and displaying the first key, a serial number associated with the control unit and instructions to a user to complete the selection of the user-selectable feature on the display device. The operations may also include receiving a second key of the public/private encryption key pair, the second key including an indication of the user-selectable feature, decrypting the second key using the first key and operating the user-selectable feature on the control unit of the ionic foot bath system.

Another implementation may take the shape of an ionic foot bath system. The foot bath system may comprise an ionizer unit configured to ionize water molecules of a water basin and a control unit coupled to the ionizer unit. Further, the control unit may comprise an I/O port associated with a network connection and configured to communicate with a network to receive an indication of a user-selectable feature to be operated by the ionic foot bath system, a display device configured to display information to a user of the ionic foot bath system, a processor coupled to the input device and the display device and a storage device coupled to the processor. The storage device may be configured to store a computer-executable code that, when executed by the processor, causes the control unit to perform certain operations. These operations may include generating a first key of a public/private encryption key pair in response to the indication of the user-selectable feature, transmitting identification information, purchase information and the first key through the I/O port to a third party, the third party also connected to the network, receiving a second key of the public/private encryption key pair from the third party through the I/O port, the second key including an indication of the user-selectable feature, decrypting the second key using the first key and operating the user-selectable feature on the control unit of the ionic foot bath system.

Yet another implementation may take the shape of a method for operating an ionic foot bath system. The method may include a first operation of receiving an indication, provided to a control unit of the ionic foot bath system through an input device, from a user-selectable feature to be operated by the ionic foot bath system. The method may also include the operations of generating a first key of a public/private encryption key pair in response to the indication, providing purchase information and the first key to a third party and receiving a second key of the public/private encryption key pair. The second key may also include an indication of the user-selectable feature to be operated by the ionic foot bath system. Finally, the method may also include decrypting the second key using the first key and operating the user-selectable feature on the control unit of the ionic foot bath system.

DETAILED DESCRIPTION

Implementations of the present invention may involve a control unit of an ionic foot bath or other health and wellness product. The control unit may be connected to a network or the Internet such that the performance of the control unit may be monitored by a third party. The connection to the network may occur through a dedicated communication line to the network or through a mobile storage device, among others. Such monitoring of the ionic foot bath system may be used by the third party to enhance the foot bath system for the user. For example, the monitoring of the foot bath system may track operational minutes of the foot bath system and notify the third party when the foot bath system may need maintenance or provide flexibility to a practitioner who may operate several foot bath systems. Other enhancements may include several user-selectable features that may be operated by the control unit of the foot bath system to enhance the system for the user.

Some such user-selectable features may include performing maintenance on the ionic foot bath system when needed or adding additional programming to the control unit. For example, the user may indicate a desire to operate a new wellness program available through the ionic foot bath system. This program may be loaded onto the control unit of the foot bath system through a network connection or through the use of encrypted codes inputted into the system by the user. Maintenance updates may also be supplied to the control unit in a similar manner. Further, these user-selectable features may be provided to the control unit directly by a third party or may be purchased by the user or practitioner before operation.

Another user-selectable feature may include a pay-per-use method for use of a ionic foot bath or other health and wellness product. The method may allow a user or an operator of the product to purchase a particular amount of operational time that is requested by the user for use of the product. The purchase of the particular amount of time may be made in many forms, including through a website over the internet or over the telephone. Once the operating time is purchased, the product may be operated by the user or a third party proprietor for the purchased amount of time, at which point, the user or proprietor may purchase more usage time as desired. Further, the purchased time may be used in separate sessions, providing the user with several usages of the product from a single purchase of usage time. When the purchase time has elapsed, the ionic foot bath may cease to operate until more operational time is purchased. The pay-per-use system may also allow a manufacturer or seller of the foot bath system to monitor and control the usage of each foot bath sold, as well as collect at least a portion of the purchased operational time as a source of income.

Figure 1:
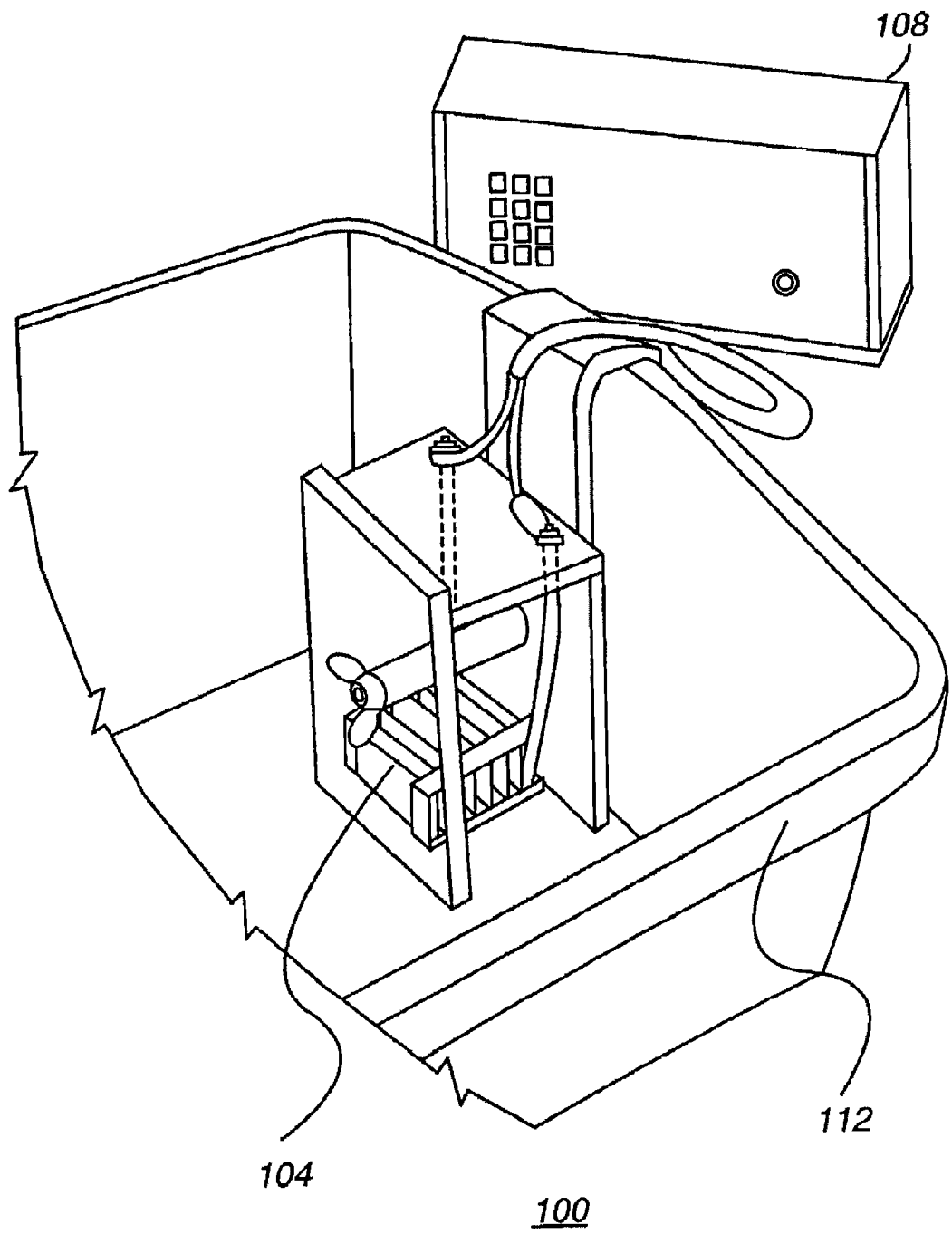
FIG. 1 is a diagram illustrating a therapeutic ionic foot bath system.

In FIG. 1, a therapeutic ionic foot bath system 100 is depicted. In general, the therapeutic ionic foot bath system includes an ionizer unit 104 interconnected to a control unit 108. In addition, the therapeutic ionic foot bath system 100 may include a basin 112. During operation, the therapeutic ionic foot bath system 100 may utilize water 236 (see FIG. 2) held in the basin 112.

Figure 2:
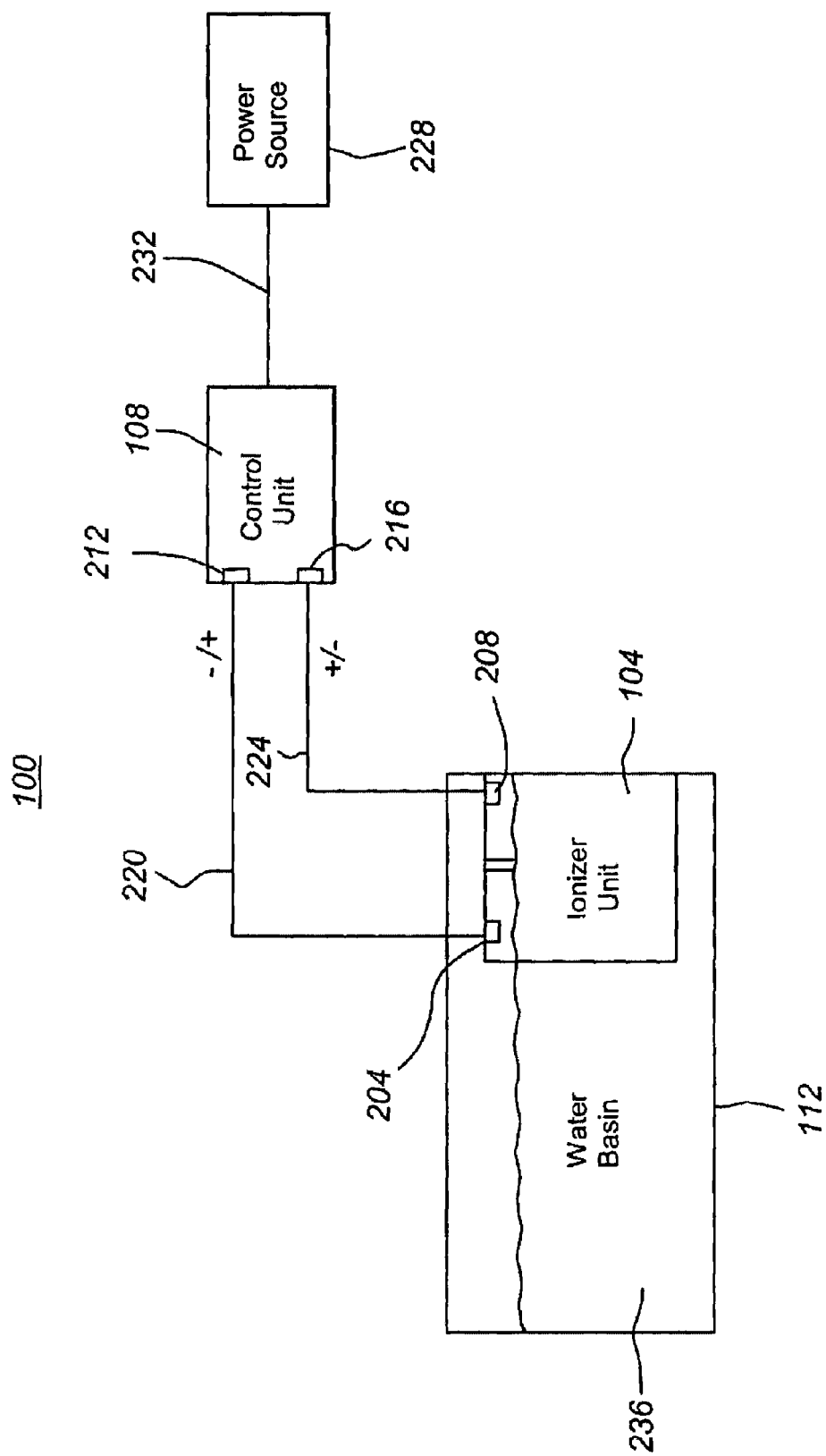
FIG. 2 is a block diagram illustrating the interrelationship between some components of a therapeutic ionic foot bath system.

FIG. 2 depicts a block diagram of the therapeutic ionic foot bath system 100. As can be seen in FIG. 2, the ionizer unit 104 includes a first electrical terminal 204, which is interconnected to a first switchable electrical terminal 212 on the control unit 108 by a first electrical conductor or conduit 220. Similarly, the second electrical terminal 208 of the ionizer unit 104 is interconnected to a second switchable terminal 216 of the control unit 108 by a second electrical conductor or conduit 224. It should be noted that the first electrical terminal 204 and the second electrical terminal 208 may not be in electrical communication, but may rather be connected to separate conductor plates within the ionizer unit. In general, the first 212 and second 216 switchable terminals of the control unit 108 are switchable in that the polarity of a voltage across the switchable terminals 212, 216 may be selectively reversed. In one implementation, the control unit 108 may supply 24V DC at the switchable terminals 212, 216. A power source 228 may provide electrical power to the control unit 108 over power supply cord 232. In accordance with one implementation, the power source 228 may be a line voltage source.

The water basin 112 is shown in FIG. 2 as holding a quantity of water 236 having ions, such as ordinary tap water. The water 236 may partially submerge the ionizer unit 104. As the control unit 108 provides an electrical signal to the ionizer unit 104, the water may ionize. By placing the feet of a user within the water basin 112 and powering the foot bath system, the user may experience a feeling of relaxation, as well as an enhanced feeling of well being.

Figure 3:
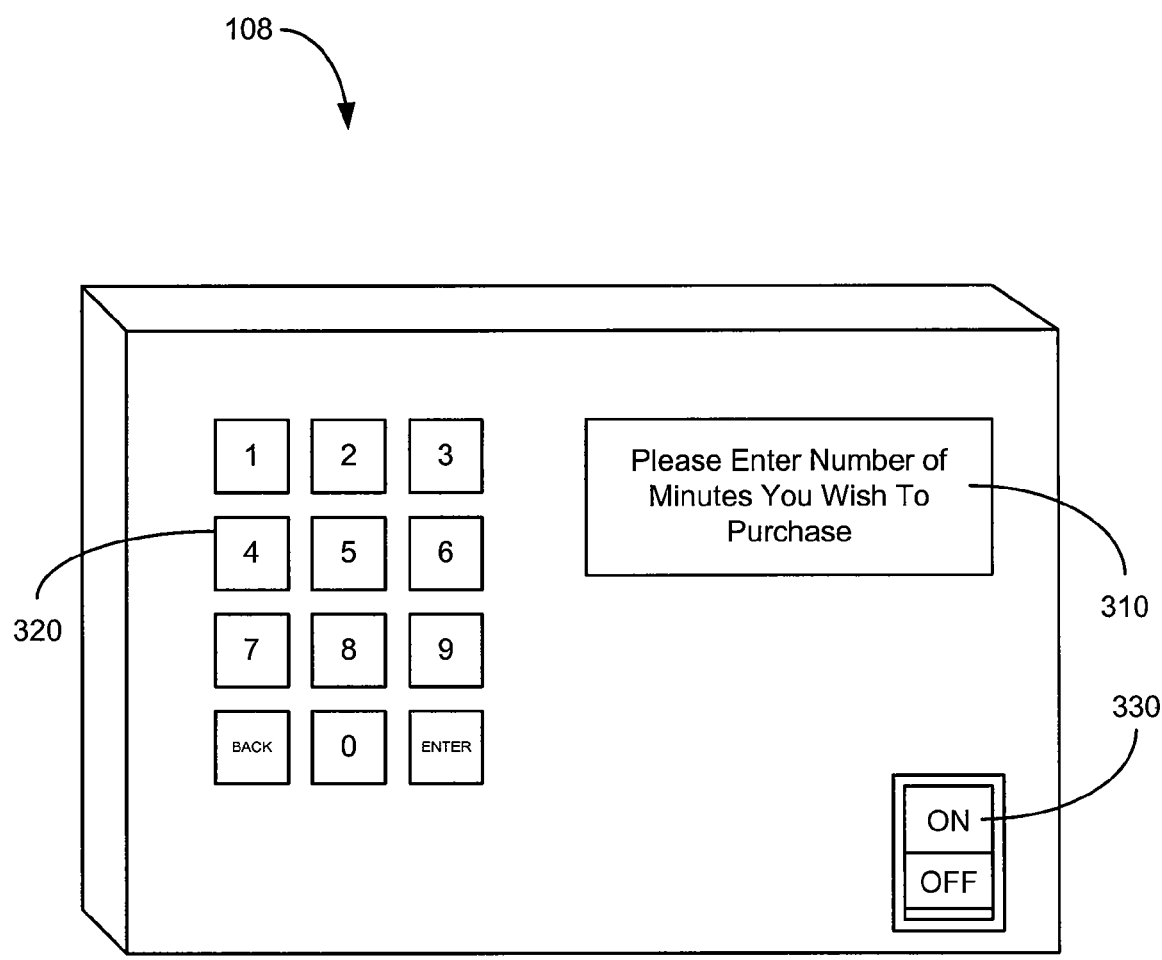
FIG. 3 is diagram illustrating a control unit for a ionic foot bath system.

FIG. 3 is a diagram illustrating a control unit 108 for an ionic foot bath system. As explained in more detail below with reference to FIG. 4, the control unit 108 may include a display screen 310 for communicating with a user, a keypad 320 to receive an input from the user and a on/off rocker switch 330. Through the input device 320 and display 310, the control unit 108 may interact with the user of the ionic foot bath system to control the use of the system. For example, one particular implementation of the ionic foot bath may include several different session types available to the user. Each session type may provide different levels of charged ions created, may have different lines of polarity charging, may alternate between positive and negative polarity, may last for different amounts of time, and so on. Thus, a first session type may provide only positively charged ions in the foot bath for 30 minutes, while another may alternate between positively and negatively charged ions for any specified amount of time. In this implementation, the user may use the keypad 320 of the control unit 108 to navigate through menus displayed to the user on the display 310 and select which session the user prefers. In this manner, the user may control the foot bath system through the control unit 108.

Figure 4:
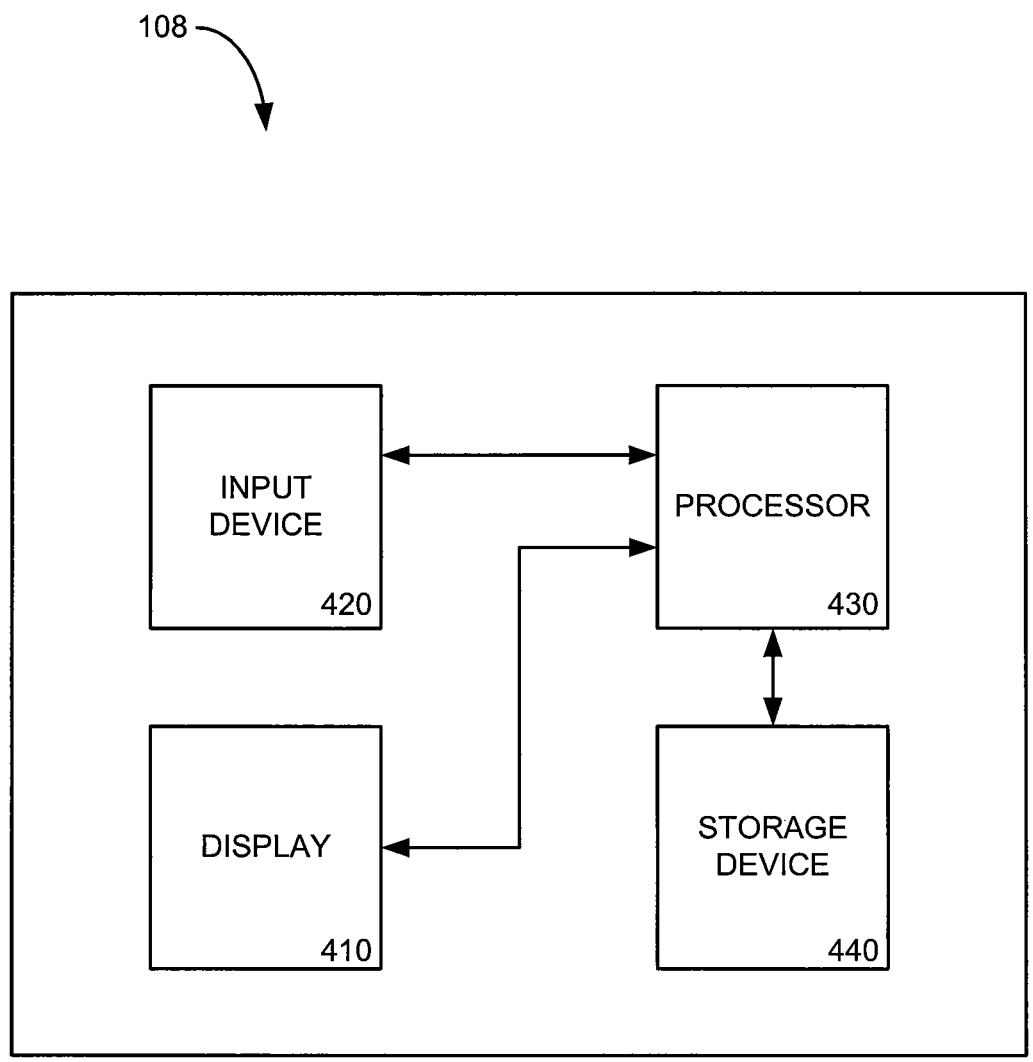
FIG. 4 is a block diagram illustrating the interrelationship between some components of the control unit of the ionic foot bath system.

FIG. 4 is a block diagram illustrating at least some components of the control unit of FIGS. 1-3. Similar to FIG. 3, the control unit 108 may include a display 410 for communicating information to a user of the ionic foot bath system. Continuing the above example, the display 410 may indicate to the user which particular session is selected and how much time remains for that session. Further, as described below, the display 410 may provide information to the user to assist the user in purchasing time to use the ionic foot bath system. The display 410 or screen may be any known or hereafter developed display device suitable for displaying information for visual perception by a user. For example, the display device may be a liquid crystal display (LCD) type display screen.

The control unit 108 may also include one or more input devices 420 that allow a user to provide information to the control box. For example, the user may use the input device 420 to select a particular session from a menu of sessions and to indicate to the control unit 108 to begin the selected session. Further, as explained below, the input device 420 may be used to provide information to the control unit 108 during the purchase of operational time, such as to provide an authorization key to complete a purchase. Besides the keypad input device described above, the input device 420 may also be an I/O port that allows a user to store and receive various information from a portable storage device, such as a flash drive, or through a network connection. Some examples of such an I/O port include, but are not limited to, a telephone port, a universal serial bus (USB) port, an RJ-45 network connection port, an I/O port to accept and access a secure device (SD) or subscriber identity module (SIM) cards, and so on. Generally, the input device 220 may be a keypad or any other known or hereafter developed input device.

The control unit 108 may also include a storage device 440 and a processor 430, electrically coupled to each other. The storage device 440 may be configured to store digital information and instructions such that, when executed by the processor 430, provides the desired functionality for the control unit 108. For example, the storage device 440 may store software that may be read and executed by the processor 430 to allow the user to select a session from a plurality of available sessions. Further, the storage device 440 may be programmable, such that the stored software may be updated or replaced with another software program, as desired by the programmer of the control unit 108. The storage device 440 may be any known or hereafter developed storage devices suitable for storing digital data. Further, the processor 430 may be any suitable processing device, circuit, etc., that may interpret instructions stored in the storage device 440 to provide the functionality of the control unit 108.

The processor 430 may also be coupled to the display 410 and the input device 420. During operation of the ionic foot bath system, the processor 430 may receive inputs from a user or administrator through the input device 420 and interpret those inputs according to the stored software instructions. Similarly, the processor 430 may also provide an output to the display 410 to communicate information to the user according to the stored software. In this manner, the processor 430 may control the various features of the control unit 108 in response to the inputs provided by a user and software instructions stored in the storage device 440.

Figure 5:
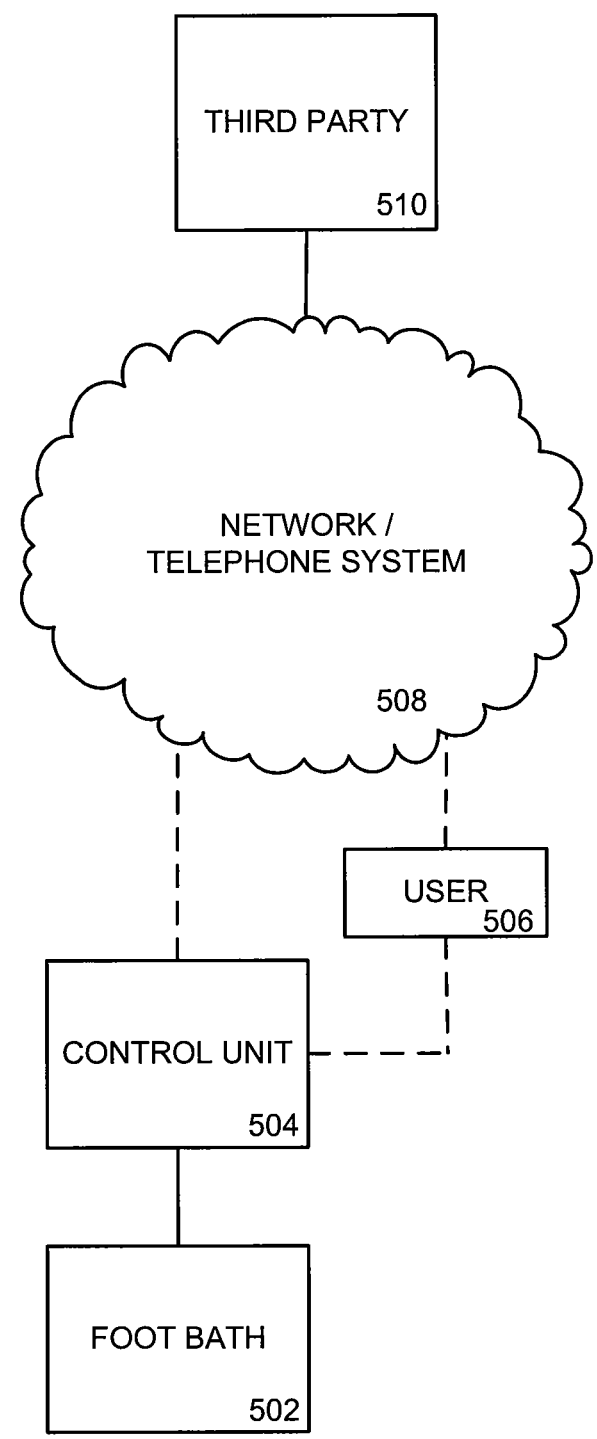
FIG. 5 is a block diagram illustrating a therapeutic ionic foot bath system connected to a network through a network or user connection.

FIG. 5 a block diagram illustrating a therapeutic ionic foot bath system connected to a network through a network or user connection. In this configuration, the ionic foot bath system may include a foot bath 502 and control unit 504 similar to those shown in FIGS. 1-4. Further, the control unit may be associated with a network or telephone system 508, through which the control unit 504 or a user 506 of the ionic foot bath system may communicate with a third party 510. Thus, in one configuration, the user 506 may communicate with the third party 510 over a telephone system 508 by placing a telephone call to the third party. In one example, the third party 510 may be an automated phone service to interact with the user 506. In another example, the user 506 may communicate with the third party 510 over the internet by accessing the third party's website. Such a configuration may be utilized by the ionic foot bath system and user 506 to purchase operational time of the system, as explained in more detail below.

In another configuration, the control unit 504 may be connected directly to the network 508 to communicate to the third party 510. In this implementation, the network 508 may be a dedicated network or may be the internet. The control unit 504 may communicate with the network through a dedicated network connection, such as an I/O port on the unit. Through the port, the control unit may access the third party 510, such as the third party's website on the internet. Such a configuration may be utilized to monitor the usage and performance of the foot bath system so that the third party may perform maintenance on the foot bath system, as well as provide programming updates to the system as needed. The maintenance and software updates for the ionic foot bath system may occur at the request of the control unit 504, or may occur automatically in response to the monitoring of the system by the third party 510. Another functionality of the system that may utilize this configuration is pay per use technology, as described in more detail below.

As described herein, the control unit 108 of the ionic foot bath system may be utilized as part of a pay-per-use method to purchase amounts of operational time for operating the foot bath system. For example, a user or administrator may purchase 100 minutes of operational time of the foot bath system. Once purchased, the ionic foot bath may operate for the purchased 100 minutes, including the use of the several session types available. Further, the user or administrator may continue to purchase operational time of the system as continued usage is desired. Generally, when the purchase time has elapsed, the ionic foot bath may cease to operate until more operational time is purchased. This pay-per-use approach may allow the user or administrator to more accurately control the usage and cost of the ionic foot bath system.

Figure 6:
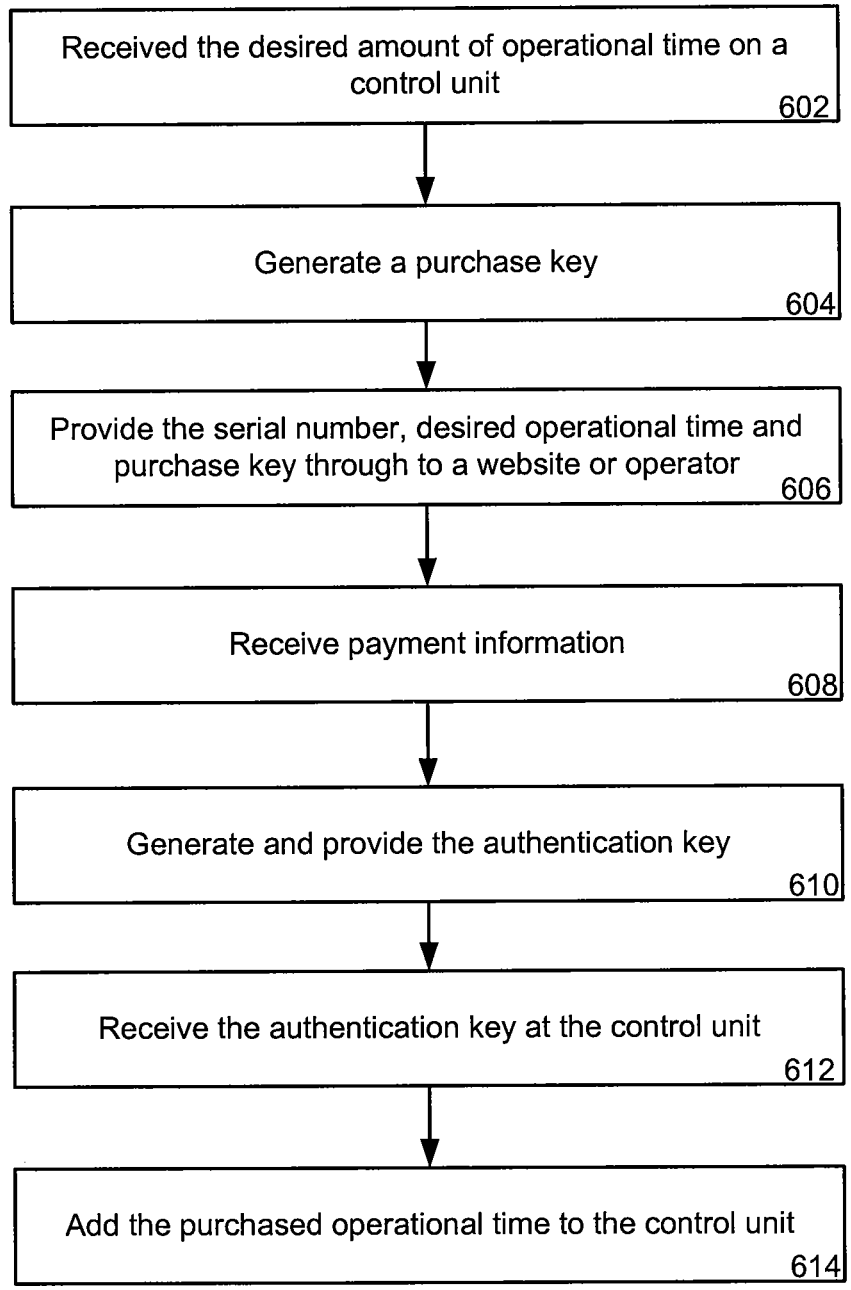
FIG. 6 is a flowchart illustrating a method for a pay-per-use system of an ionic foot bath device.

FIG. 6 is a flowchart illustrating a method for a pay-per-use system of an ionic foot bath product. As described in more detail below, the method may involve several components of the ionic foot bath system, as well as the internet, a server or telephone network. Generally, the method may allow a user or practitioner to purchase one or more segments of operational time from a third party, such as a manufacturer or supplier of the ionic foot bath system. Further, the ionic foot bath system may only operate when operational time is purchased, providing the third party with control over the usage of each ionic foot bath system sold.

The method may begin in operation 602 as the ionic foot bath system receives an amount of operational time that a user or practitioner wishes to purchase. For example, the user may desire to use the ionic foot bath system for 10 minutes. To operate the ionic foot bath, 10 minutes of operational time may be purchased from a third party. However, it should be appreciated that any amount of operational time may be purchased and stored in the control unit. For example, a user may purchase 1000 minutes of operational time that may allow the foot bath system to operate until all of the purchased time has elapsed.

To begin the purchase of the 10 operational minutes, the user may provide an indication of the amount of desired operational time to the ionic foot bath system. In one implementation, the amount of desired operational time may be input to the control box through the input device of the control unit. For example, the user may press the keys of the keypad of the control unit to navigate through a series of menus presented to the user on the display. A particular menu may query the user to enter the desired amount of operational time. The amount of purchased time may be any unit of time supported by the control unit, including seconds, minutes, hours or days, and so on. To begin purchasing the operational time, the user may then utilize the keypad to enter "10" into the control unit to indicate 10 minutes.

In one implementation, a single control unit may be used by several users. Such an implementation may be used by a practitioner having a single ionic foot bath system available to all of his/her patients. To facilitate the multiple users of the foot bath system, the control unit may maintain a database of each user's purchased operational time within the storage device of the unit. For example, patient A may purchase operational time separately from patient B and such information may be stored in the patient database of the control unit. When purchasing new operational time, an indication of which user is currently purchasing the operational time may also be provided in operation 602. For example, each user may be assigned a identification code by the control unit. This identification code may be stored in the database, along with the purchased operational time for each user. Thus, when a user wishes to purchase operational time, the user may provide the identification code to the control unit in operation 602. The identification code may be utilized by the control unit to ensure that the proper user receives the purchased operational time as stored in the database.

Upon receipt of the desired operational time from the input device of the control unit, the ionic foot bath system may provide the user with a purchase key in operation 604. In one implementation, the purchase key may be a random, fifteen digit number generated by the processor of the control unit in response to the request for the operational time. Generally, the purchase key may be part of an encryption algorithm to prevent a user from adding operational time to the control unit without first paying for the additional time. For example, the purchase key may be a first key of a public/private encryption key algorithm to encrypt the operational time purchase. Generally, the encryption algorithm used to encrypt the purchase key may be any encryption algorithm, including but not limited to, a block cipher, 40-bit to 128-bit encryption and Pretty Good Privacy (PGP) encryption scheme. Further, as explained in more detail below, the purchase key may be stored in the storage device of the control unit after generation for use in decrypting an authorization key that may allow the ionic foot bath system to add the purchased operational time. The method performed by the control unit is described in more detail below with reference to FIG. 6.

Once the purchase key is generated, it may be provided to a third party in operation 606. Other information may also be provided to the third party to aid in the purchase of the operational time. For example, the user may receive the purchase key from the control unit and provide, to the third party, the desired number of operational minutes that the user wishes to purchase, a serial number for the control unit associated with the user and the purchase key provided to the user or practitioner in operation 604. As described in more detail below, this information may be provided to the third party in a variety of ways. In one implementation, the user or practitioner may provide this information at a website or other network site associated with the third party. In another implementation, the information may be provided by the user to an operator through a telephone call. Other implementations may remove the necessity of the user or practitioner contacting the third party and may provide the information directly from the control box over a network connection or other dedicated communication line.

Payment information may similarly be provided to the third party in operation 608. For example, the user may provide payment information, such as a credit card number and billing address, to a website in a similar manner as the other purchase information is provided above in operation 606. Similarly, such payment information may be provided to an operator during a phone call or directly to a website or server from the control unit. This payment information may be used by the third party to purchase the desired amount of operational time of the foot bath. For example, a credit card number and billing address may be used by the third party to charge a user or purchaser of the ionic foot bath system for the purchased operational time. Other payment information may include on-line payment methods, such as through a Paypal account or other on-line payment method.

Once received, the information provided in operations 606 and 608 may be used to generate and provide an authorization key to the purchaser in operation 610. In one implementation, the authorization key may be provided by the website or operator that received the information from the purchaser. In another implementation, the authorization key may be provided by another third party after the payment information is provided and verified. This authorization key may be used by the ionic foot bath system to activate the foot bath for the purchased amount of time in operation 612. For example, once generated, the authorization key may be provided to the control unit, either by a user through the keypad or directly through an I/O port on the control unit. The control unit may use the authorization key, along with the stored purchase key generated in operation 604 to verify the authenticity of the purchase and to add the purchased amount of operational time to the control unit. Thus, once the purchase has been verified, the control unit may activate the ionic foot bath system for the purchased amount of time in operation 614. In this manner, a user may utilize the above described method to purchase operational time of an ionic foot bath system as desired, through the pay-per-use system.

Figure 7:
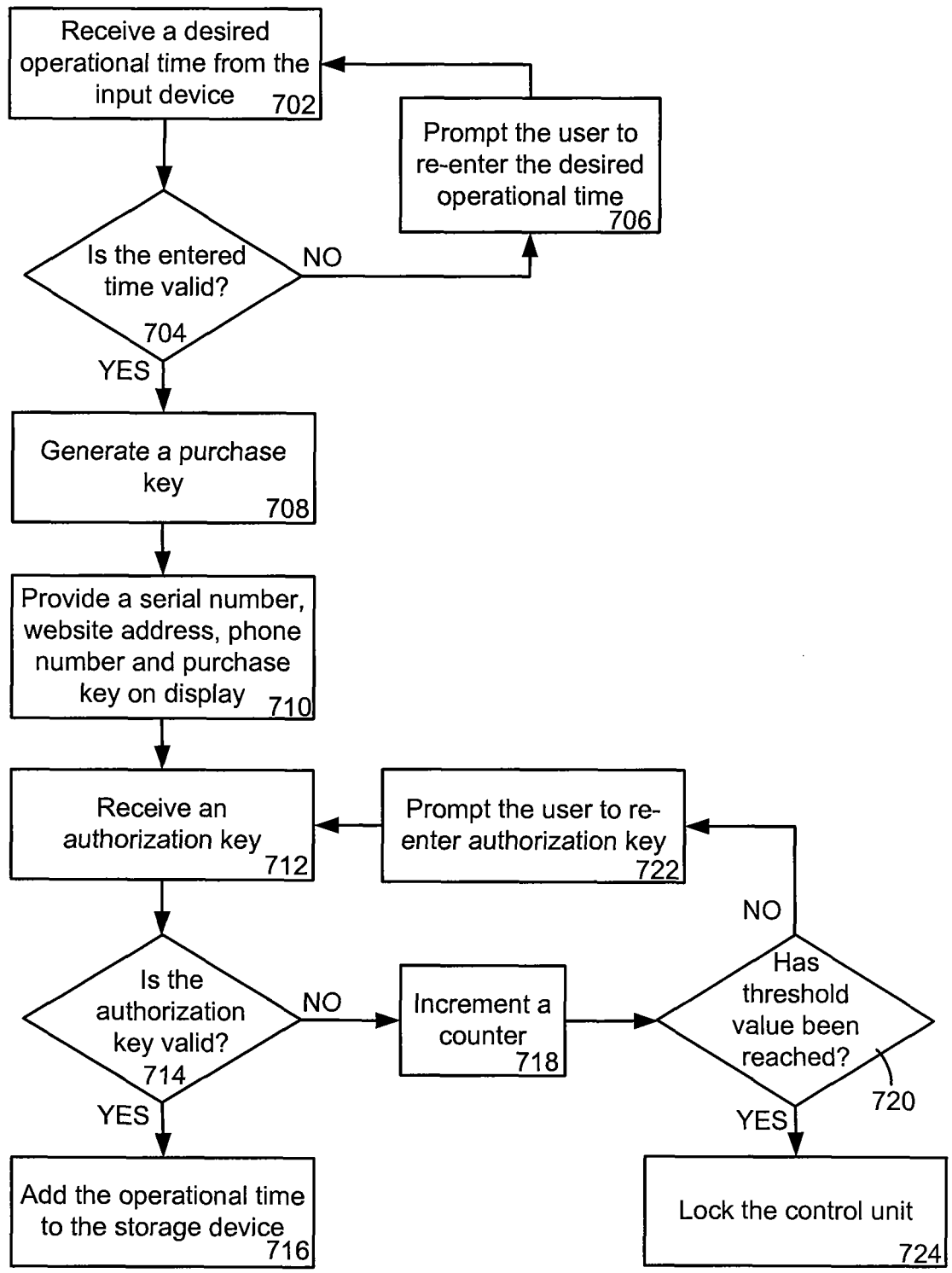
FIG. 7 is a flowchart illustrating a method for a control unit of an iconic foot bath system to provide a pay-per-use functionality to a user.

FIG. 7 is a flowchart illustrating the operations that may be performed by a control unit of an iconic foot bath system to provide a pay-per-use functionality to a user. The method may begin in operation 702 when the control unit receives the desired amount of operational time that is to be purchased. In one example, a user or practitioner may desire to purchase 100 minutes of operational time for the ionic foot bath. Once purchased, the control unit may then operate for the purchased 100 minutes as desired by the user or practitioner. As mentioned above, the amount of operational time purchased may be any amount and may be in any unit of time. Generally, however, the amount of operational time is bought in segments of minutes.

The control unit may receive the desired operational time through a variety of inputs. In one implementation, the user or practitioner of the ionic foot bath may provide the operational time to the control unit through the input device of the control unit, such as a keypad. Thus, in this example, the control box may present the user with a series of menus through the display of the control unit. In a particular menu, the control unit may request the user or operator to input the desired amount of operational time to be purchased. The user may then input the operational time using the keypad on the control unit, perhaps by pressing the numbers of the keypad. In other implementations, the control unit may receive the operational time through an I/O port, such as from a computing device, flash drive or SIM card. In still other implementations, the amount of purchased operational time may be a pre-determined amount purchased on a recurring basis. For example, a user may automatically purchase 1000 minutes of operational time per month. Similarly, the amount of purchased operational time may be based on the amount of operational time used in a previous time period. In one example, the control unit may be programmed to purchase more operational time if the usage time is below 100 minutes by the end of a month.

In operation 704, the control unit may determine if the provided operational time is valid. An operational time input may be invalid for several reasons. For example, as explained above, the control unit may provide several different types of sessions of ionic foot bath use. These sessions may require at least a particular amount of purchased time. For example, one type of session may need to operate the foot bath for 30 minutes to be optimally effective. Thus, if a user requests that particular session but only 15 minutes of operational time is requested at the control unit, the user's entry may not be a valid entry. In another example, the control box may limit the amount of operational time that a user or practitioner may purchase at any one time. In one example, the control unit may be limited to 1000 minutes of purchased time. Thus, if the purchaser's requested operational time exceeds the limit of the control unit, the request may not be a valid entry.

If the requested operational time is not valid as determined in operation 704, the control unit may notify the user of the error and prompt the user for another entry in operation 706. The error message and prompt may be provided to the user through the display of the control box. In implementations where the requested operational time is provided from a computing device or server, the control unit may prompt the providing device to re-transmit the requested operational time.

If the requested operational time is valid as determined in operation 706, the control unit may generate a purchase key in operation 708. Generally, the purchase key may be a randomly generated number of any number of digits that may be part of an encryption algorithm, such as public/private encryption key pair. Further, the control unit may store a copy of the generated purchase key in the storage device of the control box for later use in decrypting an authorization key. Generally, the purchase key may be any number of any digits that is known by the control unit that may assist in the decryption of the purchase of the operational time.

In operation 710, the generated purchase key may be provided to a user or practitioner. In one implementation, the purchase key may be presented to the user through the display of the control unit. The control unit may also provide other information to the user through the display, such as the serial number of that particular control unit and instructions on the next step in the process of purchasing operational time for the ionic foot bath. The instructions may instruct the user to log onto the internet, navigate to a particular website and enter the provided purchase key and serial number. The information may also provide the user with a telephone number that he/she may call to complete the purchase of the operational time. In other implementations, this information may not be displayed to the user. Rather, the information may be sent directly to a third party over a network connection to continue the pay-per-use process.

As explained in more detail below with reference to FIG. 7, the purchaser may use this information to purchase the desired operational time from a third party. For example, this information may be provided to a website or to an operator over the telephone. Once the information has been verified and the user has been charged for the purchase of the operational time, the user may be provided with an authorization key from the third party. This authorization key may be any number that may be associated with the purchase key such that the control unit may decrypt the authorization key and verify the purchase of the requested operational time.

Thus, in operation 712, the control unit may receive the authorization key. Similar to other information provided to the control unit, the authorization key may be provided by the user or practitioner through the keypad of the control unit in response to a prompt provided to the user through the display. In other implementations, the authorization key may be provided to the control unit through an I/O port that connects the control box to a network or mobile storage device. Generally, the authorization key may be provided to the control unit through any input device on the control unit.

In operation 714, the control unit may determine the validity of the authorization key. For example, the control unit may utilize the purchase key stored in operation 708 to decrypt the authorization key and verify the authenticity of the purchase of the operational time. Further, the authorization key may contain an indication of the serial number of the particular control unit through which the operational time was purchased. Thus, only the specific control unit that provided the purchase key may decrypt the authorization key in the correct manner. This may prevent a user from re-using authorization keys on several ionic foot bath systems. The authorization key may also contain an indication of the amount of purchased operational time that may be compared to the amount entered in operation 702, providing a second level of verification of the purchase. Generally, however, the authorization key may be any number that the control unit may use to verify the authenticity of the purchase of the operational time, such that only a single authentication key may unlock the control unit for the desired amount of operational time.

If the authorization key is valid as determined in operation 714, then the ionic foot bath system may operate for the purchased amount of operational time. To facilitate this, the control unit may store an indication of all of the purchased operational time in the storage device. If the authorization key is valid as determined in operation 714, the control unit may add the purchased operational time to the indication in the storage device of the unit. Once purchased, the user may operate the control unit until the stored operational time has expired, at which time the user may purchase more operational time. If the stored operational time has expired, the control unit may not operate until more operational time is purchased. However, it should be appreciated that it is not required that the stored operational time expire before more operational time may be purchased. Generally, operational time may be purchased at any time and added to the stored amount of operational time of the control unit.

If it is determined that the authorization key is not valid in operation 714, a counter may be incremented in operation 718. For example, the control unit may store a counter in the storage device of the control unit. The counter may track the number of incorrect authorization keys entered into the control unit. Thus, upon entry of an incorrect authorization key, the counter may be incremented by one in operation 718. Further, the counter may be compared to a threshold value in operation 720 to limit the number of incorrect authorization key entries that a user may enter into the control unit. The threshold value may be any number as determined by a control unit manufacturer.

The value of the counter may be compared to a threshold value in operation 720. If the counter has not reached the threshold value, the control unit may prompt the user to re-enter the authorization key in operation 722. This prompt may be presented to the user using the display of the control unit. In another implementation, the prompt may be a signal sent over a network connection to request re-entry of the authorization key from a computing device or server. If the counter equals to or is greater than the threshold value as determined in operation 720, the control box may cease to operate to prevent the user from attempting to re-enter another authorization key in operation 724. In this manner, the control box may prevent a user from attempting to guess the authorization key by entering random numbers into the control unit.

Generally, the control unit may continue to cease to operate until a reset signal has been sent to the control unit. In one implementation, the user or practitioner may need to send the control unit to the manufacturer to reset the unit or acquire a special code from the manufacturer. Alternatively, the control unit may be programmed to lock for a particular amount of time, such as 2 hours. Generally, however, the control unit may cease to operate for any amount of time to prevent a user from bypassing the decryption of the authorization key.

The operations described above with reference to FIG. 7 generally apply to a control unit of the ionic foot bath system. This control unit may be similar to the control unit 108 shown in FIGS. 1-4. The method of FIG. 8 may be a method for a third party to provide purchased time to a user of an ionic foot bath system. Generally, the operations of FIG. 8 may occur between operations 710 and 712 of the method described in FIG. 7. However, it should be appreciated that these operations may occur at any point in the pay-per-use process of purchasing the operational time.

Figure 8:
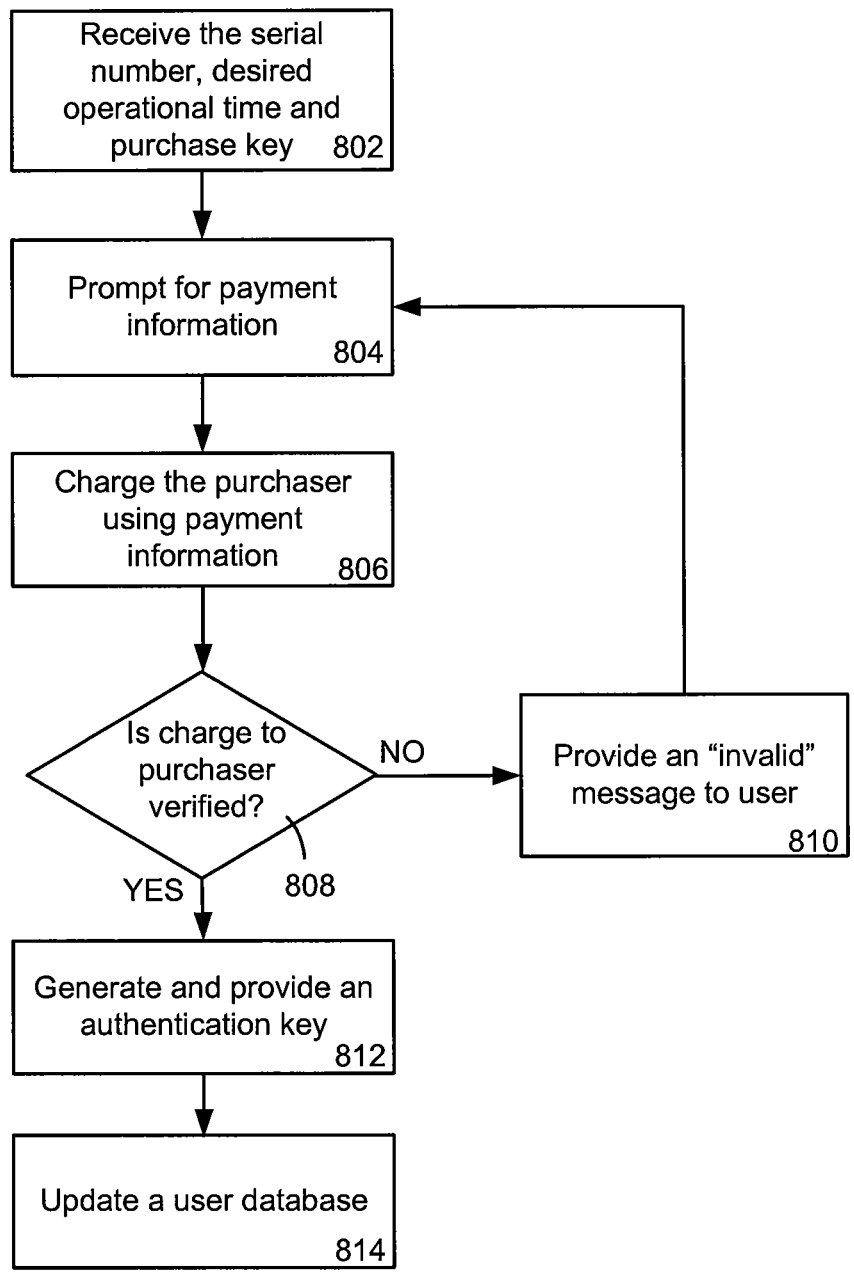
FIG. 8 is a flowchart illustrating a method for a website or operator of a pay-per-use iconic foot bath system to provide purchased operational time to a user.

The operations of FIG. 8 may be performed by a third party through several means. For example, the operations may be performed by a website that is maintained by a third party (such as a manufacturer or seller of the ionic foot bath) and accessed by a user through the internet. In another implementation, the operations may be performed by an operator that receives a telephone call from a user. Still another implementation may include a computing device server connected to the control unit of the foot bath system through a network connection that may perform the operations of the described method.

The method may begin in operation 802 when the website receives information from a user or a control unit. In one implementation, this operation may be performed after operation 710 of FIG. 7. The information provided may include, but is not limited to, the serial number of the control unit of the particular ionic foot bath system that is purchasing time, the desired amount of operational time to be purchased and a purchase key. The provided purchase key may be the same purchase key provided by the control unit in operation 610 of FIG. 6. In one implementation, this information may be provided by a user through a website that is accessed by the user. Thus, the website may prompt the user to provide the information using the website interface. Similarly, the information may be provided to a live or automatic pushbutton operator over the telephone. In another implementation, the control unit of the particular ionic foot bath system may automatically access the website or a network server and provide the information when operational time is to be purchased.

Once the above information is provided, the website may prompt the user or control box for payment information in operation 804. Payment information may include, but is not limited to, a full name of the purchaser, a credit card number and a billing address. Generally, payment information may include any information that may assist a third party in charging the purchaser for the purchased operational time. This information may be provided in the same manner as the information provided in operation 802. Alternatively, the information may be stored in a database in communication with the website. In the database implementation, once the payment information is provided, the website may use the information to identify the purchaser and access that purchaser's payment information from the database. Once the payment information is retrieved, the third party may charge the purchaser for the purchased operational time.

In operation 806, the payment information gathered in operation 804 may be used to charge the purchaser for the newly bought operational time. This configuration allows the charge for operation time to be controlled by the third party and not by the foot bath. Thus, the third party may adjust the charge for each purchase of operational time, as well as provide promotional items to the user, such as promotional codes to reduce the cost per minute of purchased operational time. In one example, the website may use the credit card number provided by the purchaser or control unit to charge the purchaser by contacting the user's credit card company. Upon a successful charge, the credit card company may provide a return validation signal to the website that the purchaser was successfully charged.

In operation 808, the website may use the validation signal provided by the credit card company to verify that the operational time purchase was completed. If the purchase was not completed, the website may provide an indication to the purchaser or control unit that the purchase was not completed in operation 810. The purchase may fail for several reasons, including insufficient funds or improper billing information provided by the user. In this case, the website or operator may again prompt the purchaser or control unit for the payment information to retry the purchase of the operational time.

In other implementations, operations 804-810 may be bypassed altogether. For example, the website may, instead of charging the purchaser at the time of purchase, record the operational time purchase for the purchaser and provide a billing statement to the purchaser at a later time. In this implementation, the website may record each purchase of operational time made by a particular control unit and bill the purchaser accordingly after a period of time, such as monthly. Thus, in this implementation, operation 812 may be performed after operation 802.

If it is determined in operation 808 that the purchase was validly completed, the website may generate and provide an authentication key to the user or control unit in operation 812. In one implementation, the authentication key may be a five digit number. Further, the authentication key may be associated with the purchase key generated by the control unit in operation 608 of FIG. 6. For example, the generated purchase key may be one key of a public/private encrypted key pair. The authentication key generated in operation 812 may be the opposing key of the encrypted key pair. Thus, the authentication key may be generated such that both keys are needed to decrypt the purchased operational time and add the purchased time to the control unit. Generally, the authentication key may be any number that is part of an encryption algorithm such that the control box may recognize the validity and security of the key and unlock the purchased amount of operational time of the ionic foot bath system.

Upon delivery of the authentication key to the purchaser or control unit, the website or operator may update a database containing information on each control unit in operation 814. For example, the third party website may maintain a database listing every control unit delivered to the customers of the ionic foot bath system. Each entry in the database may associate the serial number of the control unit with a purchaser. Further, each entry may maintain information on the purchaser of the control unit, such as the purchaser's name and address or location where the control unit may be located. The database may also maintain a record of each purchase of operational time made for each control unit. This record may be accessed and analyzed by a third party to provide an overview of the frequency of use of each control unit. Such information may be useful in providing suggestions to a customer on maintenance of the ionic foot bath system. For example, a reminder may be sent to a customer when their control unit reaches 1,000 hours of operation to replace the array of the system or to perform other maintenance on the foot bath system.

The database may also assist in the billing of the customers of the ionic foot bath system in the implementation where a bill is generated for each operational time purchase, rather than charging the purchaser prior to use. Thus, the database may be accessed by a billing company to generate a monthly bill for each customer of the system. Further, the number of purchases may be analyzed to determine if any irregularities with a particular customer may be occurring. For example, an inordinate amount of operational time purchases for a single control unit may trigger a notice to the owner of the particular unit to determine the validity of each purchase. The third party may also prevent any further operational time purchases until such irregularities are verified.

Figure 9:
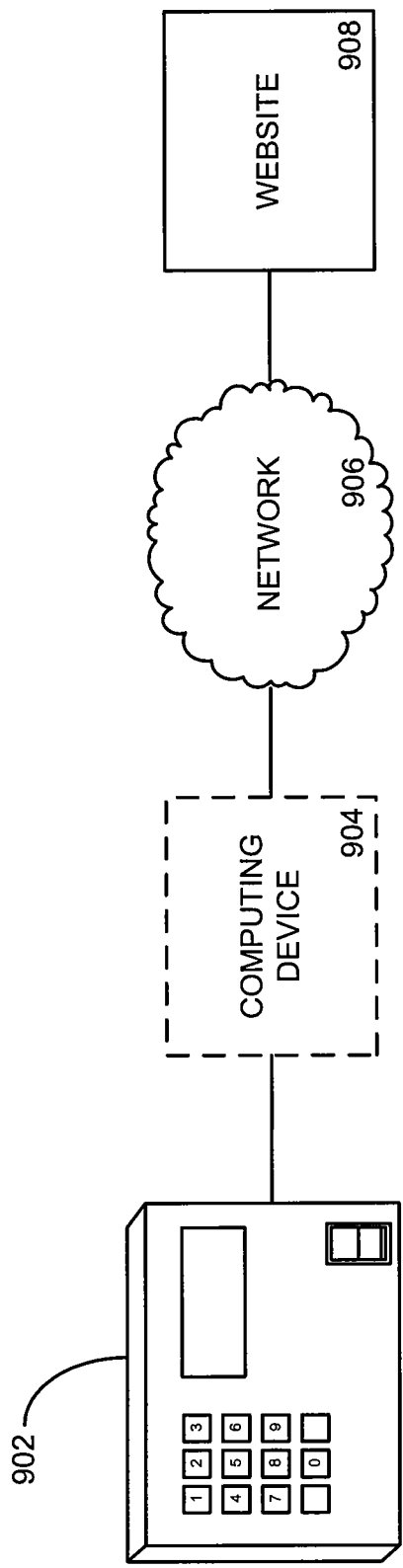
FIG. 9 is a diagram illustrating an ionic foot bath control unit connected to a network over which a purchaser may purchase usage time of the foot bath.

As explained above, the ionic foot bath system may apply the methods described in FIGS. 6-8 to provide a pay-per-use functionality for the foot bath. Further, this system may be implemented in several ways, including but not limited to, a website, a telephone operator or a dedicated network connected to a remotely located control unit. FIG. 9 is a diagram illustrating one ionic foot bath system configuration, including a control unit connected to a website through a network to purchase operational time in a pay-per-use system.

In the configuration displayed in FIG. 9, the control unit 902 may be connected to a network 906 through an I/O port of the control unit. Some examples of a suitable I/O port may be a telephone port, a universal serial bus (USB) port or a RJ-45 network port. The control unit 902 may also access the network 906 through a wireless interface coupled with or integrated to the control unit. The control unit 902 may utilize the network connection to access a server configured to perform the operations of FIG. 8 above. Similarly, the network 906 may be the Internet, through which the control unit may access a website 908 that may perform the operations of FIG. 8.

In some implementations, the network 906 may include a computing device 904, such as a personal computer, laptop or mobile phone device. In this implementation, the control unit 902 may be coupled with the computing device 904, perhaps through one of the I/O ports described above. Thus, the control unit 902 may interface with the computing device 904 to access the network 906 to perform the operations described above.

In still other implementations, the control unit 902 may interface with the computing device 904 through a mobile storage device. For example, the control unit 902 may include an I/O port for a USB flash drive. The microprocessor of the control unit 902 may access the flash drive to store and read information, such as the authentication key and purchase key described above. A user of the control unit 902 may plug a flash drive into the control unit and perform the operations to receive the purchase key as described above in FIG. 6. Once the purchase key (as well as any other information) may be saved on the flash drive, the user may remove the flash drive from the control unit 902 and insert the flash drive into the computing device 904. The computing device 904 may then access the stored information in the flash drive and provide that information to a server or website 908 over the network 906. Once the server or website has returned the authentication key, the computing device 904 may store the key on the flash drive, which may be removed from the computing device and plugged into the control unit 902. The control unit 902 then may access the stored authentication key to complete the purchase of the operational time for the ionic foot bath system. In a similar manner, the control unit 902 may interface with the computing device 904 through a secure digital (SD) card or subscriber identity module (SIM) card that may be read by the computing device 904 and control unit.

Another implementation may include a card reader coupled to the control unit 902, the card reader capable of reading a magnetic strip located on a credit card-type device, such as a debit card or a gift card. In such an implementation, the card device may perform similar functions as the mobile storage devices described above. For example, the card device may be inserted into or otherwise coupled to a computing device 904 to receive an authentication key from the server or website of a third party, similar to the authentication key provided above in FIGS. 6-8. This information may be written to and stored on a magnetic strip of the card device. The card device may then be swiped or inserted into the card reader coupled to the control unit 902 of the ionic foot bath system such that the card reader may retrieve the information stored on the magnetic strip of the card device. Such a card reader may be integrated into the control unit 902 or may communicate with the control unit over a communication line. In this manner, the authentication key may be provided to the control unit 902 to operate the foot bath system after purchase of the operational time.

The mobile storage device may also be utilized to share purchased operational time between control units of several ionic foot bath systems. For example, the mobile storage device may be coupled to the control unit of a first ionic foot bath system with purchased operational time on the control unit. The control unit may then store the purchased operational time from the first foot bath system on the mobile storage device. Once stored, the mobile storage device may then be coupled with the control unit of a second ionic foot bath system, which may retrieve the stored operational time from the mobile storage device and apply it to the second foot bath system. Further, the transfer of operational time from one foot bath system to another may include several of the operations described above with reference to FIGS. 6-8. For example, an encryption key pair may be utilized by the control units to provide security to the transfer of the purchased operational time.

As should be appreciated, the implementations described above including a mobile storage device may provide a practitioner greater flexibility in the services given to the practitioner's patients. For example, a practitioner may offer several ionic foot bath systems for use by his/her patients. As each patient requests operational time, the practitioner may load an associated authentication key onto the mobile storage device upon purchase of the operational time by the patient. The mobile storage device may then be provided to the patient and coupled to the designated ionic foot bath system to operate the foot bath. Further, once used, each mobile storage device may be reloaded with a new authentication key for use on an additional ionic foot bath system. Thus, a credit card-type storage device may be reloaded multiple times with purchased operational time and provided to the patients of the practitioner as needed. Additionally, if one of the foot bath systems has purchased operational time stored in the control unit but cannot be used for any reason, the operational time may be removed from the control unit and stored on another foot bath system operated by the practitioner.

The ionic foot bath system may also utilize the connection of the control unit 902 to the network 906 to perform maintenance or diagnostics on the foot bath system, as well as provide programming updates to the control unit. Thus, the control unit 902 may communicate with a website 908 that may analyze the control unit for defects or periodic maintenance procedures. In a similar manner, the control unit 902 may not only purchase operational time from a website, but may also purchase entire packages. These packages may include one or more of the available sessions of the foot bath system, thus removing the necessity of the user to remember the required amount of operational time for each session. Instead, the user or control unit 902 may purchase a package that includes the required amount of operational time. Further, new programs including one or several sessions may be downloaded to the control unit 902 from the network 906 based on the usage of the foot bath system by the user.

Figure 10:
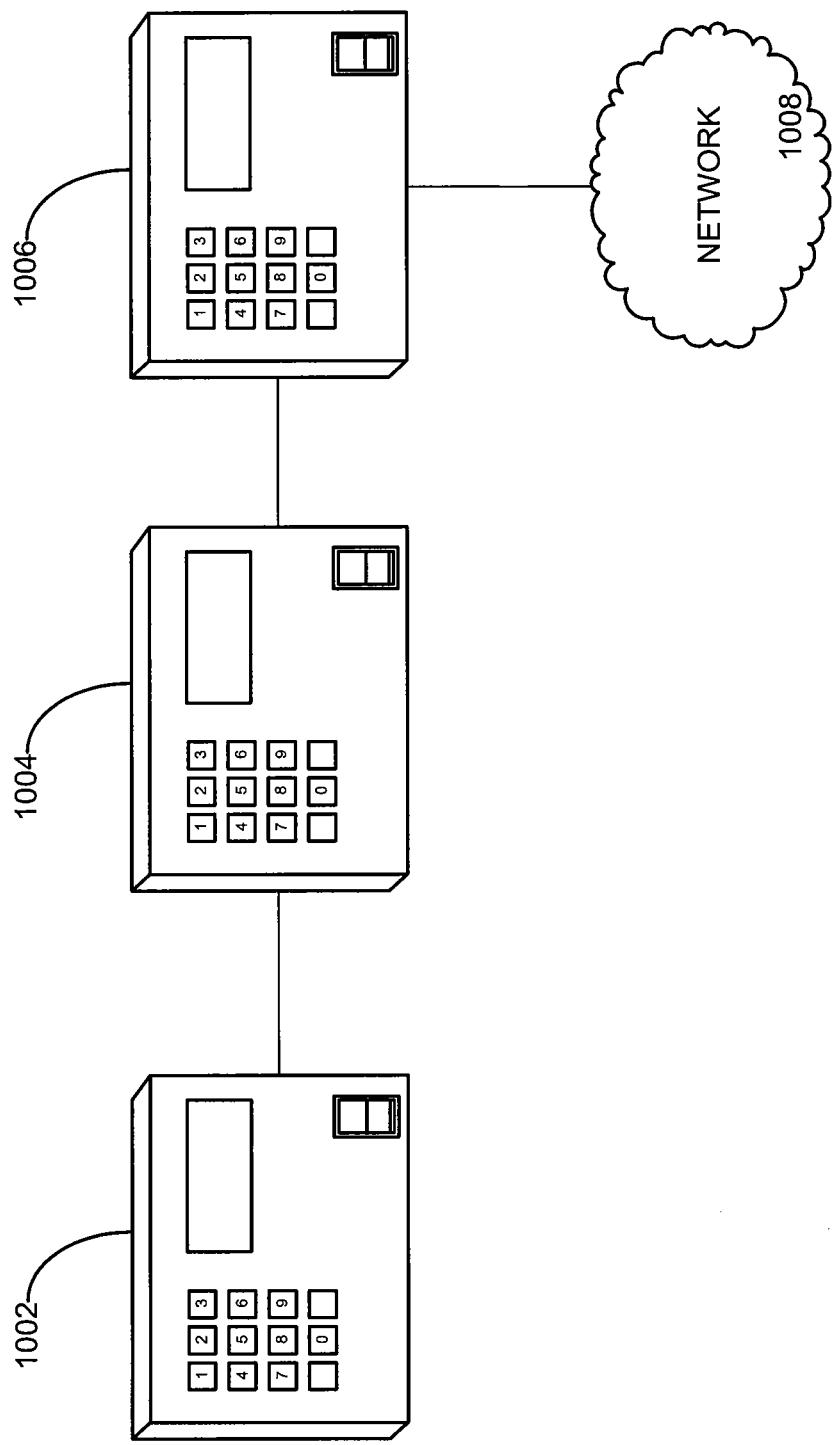
FIG. 10 is a diagram illustrating several ionic foot baths interconnected and associated with a network that may implement a pay-per-use system.

In another implementation, several control units 1002-1006 may be connected in series to reduce the number of network or internet connections needed to communicate with a network 1008. FIG. 10 is a diagram illustrating several ionic foot baths 1002-1006 interconnected and associated with a network 1008 that may implement a pay-per-use system.

In this configuration, control units 1002-1006 may be associated or otherwise connected together such that electronic information may be passed from one control unit to another. This connection may take the form as described above, namely through an I/O port or wirelessly. Further, one control unit 1006 may be further connected to a network 1008, either directly or through a computing device as described above with reference to FIG. 9. The network connected control unit 1006 may act as a master controller for each control unit associated with the master, or may simply act as a pass-through and allow the associated control units to communicate directly to the network 1008. Further, each control unit may perform the above described methods to provide a user with a pay-per-use functionality for each control box.

It should be noted that the flowcharts of FIGS. 6 through 8 are illustrative only. Alternative embodiments of the present invention may add operations, omit operations, or change the order of operations without affecting the spirit or scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention.

What is claimed is:

1. A control unit for an ionic foot bath system comprising:
an input device configured to receive a first indication of an operational time of the ionic foot bath system;
a display device configured to display information to a user of the control unit;
a processor communicatively coupled to the input device and the display device; and
a storage device communicatively coupled to the processor and configured to store a computer-executable code that, when executed by the processor, causes the control unit to perform the operations of:
generating by the processor a first key in response to the indication of the operational time;
displaying, on the display device, the first key, a serial number associated with the control unit and a set of instructions to a user to complete the operational time selection with an authorization source;
receiving, from the authorization source or input device, a second key encrypted using the first key and including an indication of the operational time;
decrypting by the processor the second key using the first key; and
activating the ionic foot bath for a time corresponding to the operational time indicated by the decrypted second key.

2. The control unit of claim 1 wherein the input device is further configured to receive a second indication corresponding to one of maintenance of the control unit or updating the computer-executable code.

3. The control unit of claim 2 wherein the input device is an I/O port associated with a network connection.

4. The control unit of claim 3 wherein the computer-executable code further causes the control unit to perform the operation of:
transmitting the first key through the I/O port and the associated network connection to an authorization source.

5. The control unit of claim 4 wherein the second key is received from the authorization source after the authorization source verifies a purchase of the operational time.

6. The control unit of claim 3 wherein the I/O port is one of a universal serial bus (USB) port, a secure digital (SD) card reader or a subscriber identity module (SIM) card reader.

7. The control unit of claim 3 wherein the I/O port is a wireless connection.

8. The control unit of claim 2 wherein the input device is a keypad.

9. An ionic foot bath system comprising:
an ionizer unit configured to ionize water molecules of a water basin; and
a control unit coupled to the ionizer unit, the control unit comprising:

an I/O port associated with a network connection and configured to communicate with a network to receive a first indication of an operational time corresponding to an operating time of the ionic foot bath system;

a display device configured to display information to a user of the ionic foot bath system;

a processor communicatively coupled to the input device and the display device; and a storage device communicatively coupled to the processor and configured to store a computer-executable code that, when executed by the processor, causes the control unit to perform the operations of:

generating by the processor a first key in response to the first indication of the operational time;

transmitting identification information, purchase information and the first key through the I/O port to an authorization source, the authorization source also connected to the network;

receiving a second key encrypted using the first key from the authorization source through the I/O port;

decrypting by the processor the second key using the first key; and operating the ionic foot bath system for the operating time corresponding to the first indication of the operational time indicated by the decrypted second key.

10. The ionic foot bath system of claim 9 wherein the I/O port is further configured to receive a second indication corresponding to one of maintenance of the control unit or updating the computer-executable code.

11. The ionic foot bath system of claim 9 wherein the identification information includes the serial number of the control unit.

12. The ionic foot bath system of claim 9 wherein the purchase information includes a users credit card number and billing address.

13. The ionic foot bath system of claim 10 wherein the authorization source charges a user of the ionic foot bath system for the purchased amount of operational time before operating the user-selectable feature.

14. The ionic foot bath system of claim 10 wherein the computer-executable code further causes the control unit to perform the operation of:

receiving updates to the computer executable code provided by the authorization source, the updates received through the I/O port.

15. The ionic foot bath system of claim 10 wherein the computer-executable code further causes the control unit to perform the operations of:

providing status updates to the authorization source through the I/O port; and receiving maintenance updates from the authorization source through the I/O port in response to the status updates provided by the control unit.

16. A method for operating an ionic foot bath system, the method comprising:

receiving by an input device an indication from a user of an operational time of the ionic foot bath system;

generating, by a processor, a first key in response to the indication, the first key corresponding to the operational time;

transmitting by an input/output port providing purchase information and the first key to an authorization source;

receiving, by the input/output port, a second key from the authorization source corresponding to the first key, the second key encrypted using the first key and including the operational time of the ionic foot bath system;

decrypting, by the processor, the second key using the first key; and operating by the processor the ionic foot bath system for the operational time indicated by the decrypted second key.

17. The method of claim 16 wherein the input/output port is further configured to receive a second indication corresponding to at least one of maintenance of the control unit or updating the computer-executable code.

18. The method of claim 16 further comprising:

displaying on a display device, the first key and a set of instructions to the user.

19. The method of claim 18 further comprising:

determining by the processor, the validity of the second key; and in the case where the second key is invalid, the processor increments counter; compares the counter to a threshold value; and directs the display device to display a message requesting for re-entry of the second key.

20. The method of claim 16 wherein the input device is a keypad.

21. The method of claim 16 wherein the input device is an I/O port.

22. The method of claim 16 wherein the providing operation includes transmitting the purchase information and first key over a network connection.

23. The method of claim 17 wherein the purchase information includes the serial number of the control unit, the amount of operational time and billing information of the user.

24. A method for operating an ionic foot bath system having an ionizer unit comprising:

receiving by an input device an operational time input corresponding to an operating time of the ionizer unit;

displaying on a display device a first key corresponding to the operational time input;

receiving from the input device a second key encrypted using the first key;

decrypting by a processor the second key using the first key;

determining by the processor if the second key is valid; and if the second key is valid, activating by the processor the ionizer unit for an operating time corresponding to the operational time input.

25. The method of claim 24, further comprising:

comparing by a processor the operational time input to a predetermined time;

if the operational time is less than the predetermined time, displaying on the display device that the operational time input is not valid.

* * * * *